United States Patent Office 3,452,008
Patented June 24, 1969

3,452,008
NOVEL 7-THIOACYL-17-SPIROLACTONE GONANES
George C. Buzby, Jr., Philadelphia, and Herchel Smith, Wayne, Pa., assignors to American Home Products Corporation, New York, N.Y., a corporation of Delaware
No Drawing. Filed Aug. 12, 1966, Ser. No. 572,002
Int. Cl. C07c 173/00; A61k 17/06
U.S. Cl. 260—239.57
5 Claims

ABSTRACT OF THE DISCLOSURE

This invention concerns new and novel 13-alkyl-17-hydroxy-7α-mercapto-3-oxogon-4-ene-17α-propionic acid, γ-lactone, acylates which are pharmacologically active as anti-diuretic agents.

This invention relates to new and novel 7-thioacyl-17-spirolactone gonanes and related intermediate compounds.

In particular, the present invention is concerned with 13-alkyl-17-hydroxy-3-oxogona-4,6-diene-17α-propionic acid, γ-lactones which are useful intermediates in the preparation of the pharmacologically active 13-alkyl-17-hydroxy-7α-mercapto-3-oxogon-4-ene-17α-propionic acid, γ-lactone, acylates.

The novel compounds which are included within the scope of this invention are represented by the following formulae:

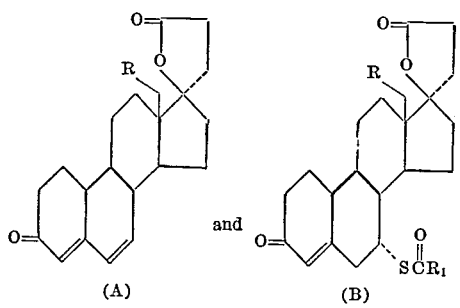

wherein R is alkyl containing from two to six carbon atoms and $R_1$ is lower alkyl. The new compounds of the above Formula A are properly called: "13-alkyl-17-hydroxy-3-oxogona-4,6-diene-17α-propionic acid, γ-lactones." Typical examples thereof are: 13-ethyl-17-hydroxy-3-oxogona-4,6-diene-17α-propionic acid, 2-lactone; 13-butyl-17-hydroxy-3-oxogona-4,6-diene-17α-propionic acid, γ-lactone; and 17-hydroxy-3-oxogona-4,6-diene-13-propyl-17α-propionic acid, γ-lactone. The new compounds of the above Formula B are properly designated: "13 - alkyl - 17-hydroxy-7α-mercapto-3-oxogon-4-ene-17α-propionic acid, γ-lactone, acylates," such as: 13-ethyl-17-hydroxy-7α-mercapto-3-oxogon-4-ene-17α-propionic acid, γ-lactone, acetate; 13-butyl-17-hydroxy-7α-propionic acid, γ-lactone, propionate and 13-hexyl-17-hydroxy-7α-mercapto-3-oxogona-4-ene-17α-propionic acid, γ-lactone, butyrate.

The new and novel compounds of the present invention may be prepared by the process generally illustrated by the following equation:

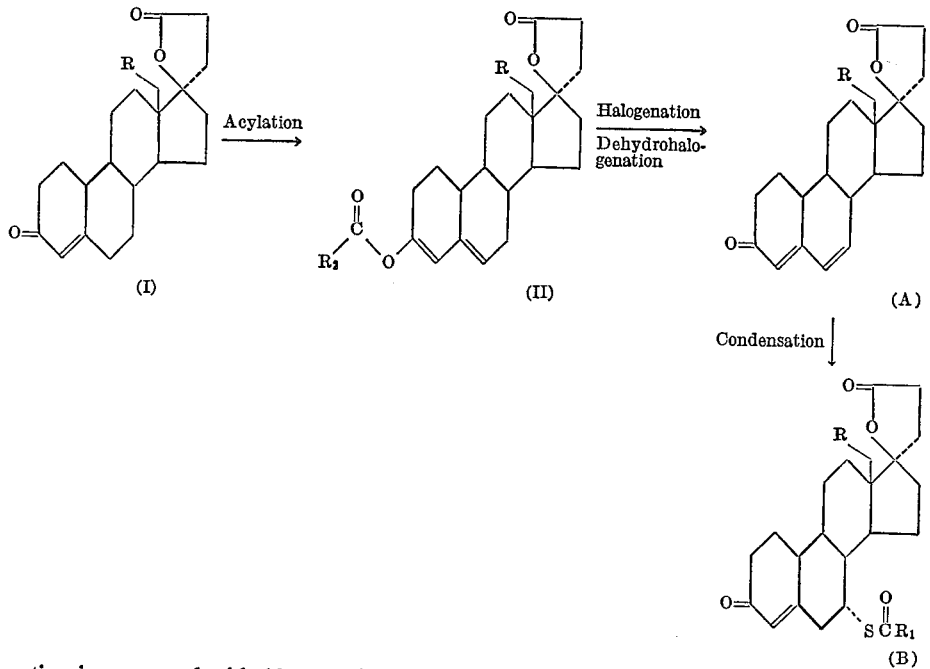

wherein R and $R_1$ are defined as above and $R_2$ is lower alkyl. The acylation reaction is effected by contacting an acylating agent with a 13-alkyl-17-hydroxy-3-oxogon-4-ene-17α-propionic acid, γ-lactone (I) and refluxing the mixture for from about a half hour to about five hours. Suitably this acylation may be conducted by contact with acetyl chloride, pyridine and acetic anhydride while other satisfactory acylating agents for this purpose will readily suggest themselves to those skilled in the chemical art. After the reaction is complete, the reaction mixture is evaporated to dryness, triturated with an alkanol and filtered to yield a 13-alkyl-3,17-dihydroxygona-3,5-diene-17α-propionic acid, γ-lactone, acylate (II).

Halogenation and dehydrohalogenation of the above prepared 13-alkyl-3, 17-dihydroxygona-3, 5-diene-17α-propionic acid, γ-lactone, acylate (II) is effected by admixing an aqueous mixture containing acetone, pyridine, sodium acetate, acetic acid and an appropriate compound (II) with a halogenating agent, such as, N-bromosuccinimide, and stirring the resulting mixture at a temperature from about −10° C. to about 10° C. for a period of about one to about four hours. Thereafter, the reaction mixture is poured into a salt solution; extracted with a water-immiscible organic solvent, e.g., ether, chloroform, carbon tetrachloride and hexane; and partially evaporated at reduced pressures and temperatures. The concentrate is then admixed with calcium carbonate and dimethylformamide. The mixture is then refluxed for a period of from one to three hours. After the dehydrohalogenation reaction is complete, the resulting 13-alkyl-17-hydroxy-3-oxogona-4,6-diene-17α-propionic acid, γ-lactone (A) is obtained by conventional methods such as filtration, extraction and crystallization.

The condensation of a 13-alkyl-17-hydroxy-3-oxogona-4,6-diene-17α-propionic acid, γ-lactone (A) with a thiol carboxylic acid is effected by refluxing a mixture thereof for a period of about one to about four hours. When the reaction is complete, the excess acid is removed by evaporation and the residue is the appropriate 13-alkyl-17-hydroxy-7α-mercapto-3-oxogon-4-ene-17α-propionic acid, γ-lactone, acylate (B) which may be further purified by procedures well known to those skilled in the art of chemistry, such as, for example, trituration with ethyl acetate and filtration.

The starting steroids, the 13-alkyl-17-hydroxy-3-oxogon-4-ene-17α-propionic acid, γ-lactones (I), utilized in the preparation of the compounds of this invention are prepared by the procedure described in copending United States patent application, Ser. No. 388,820, entitled "Gon-4-Enes," filed Aug. 11, 1964 by Gordon Alan Hughes and Herchel Smith. The 13-alkyl-3,17-dihydroxygona-3,5-diene-17α-propionic acid, γ-lactone, acylates (II) intermediates are known compounds which are described in United States patent application, Ser. No. 540,984, entitled "Synthesis of Gona-3,5-dienes," filed Apr. 7, 1966 by Gordon Alan Hughes and Herchel Smith.

In accord with the present invention the 13-alkyl-17-hydroxy-3-oxogona-4,6-diene-17α-propionic acid, γ-lactones (A) of this invention are utilized as intermediates in the preparation of the 13-alkyl-17-hydroxy-7α-mercapto-3-oxogon-4-ene-17α-propionic acid, γ-lactone, alkylates (B) of this invention, which have been found to possess interesting pharmaceutical properties which render them useful as synthetic medicinals. More particularly, these compounds, in standard pharmacological tests have exhibited utility as anti-diuretic agents.

When the compounds of this invention are employed as anti-diuretic agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1 mg. to about 200 mg. per day, although as aforementioned variations will occur. However, a dosage level that is in the range of from about 5 mg. to about 50 mg. per day is most desirably employed in order to achieve effective results.

The following examples are given by way of illustration and are not to be construed as limitations of this invention, many variations of which are possible without departing from the scope and spirit thereof.

EXAMPLE I 13-ethyl-17-hydroxy-3-oxogon-4-ene-17α-propionic acid, γ-lactone (5.0 g.) is refluxed for two hours with acetic anhydride (90 ml.), acetyl chloride (35 ml.) and pyridine (3.52 ml.). Thereafter, the liquids are removed under reduced pressure, the residue triturated with cold methanol and filtrated to yield 13-ethyl-3,17-dihydroxygona-3,5-diene-17α-propionic acid, γ-lactone, acetate (5.50 g.) M.P. 194–200° C., $\lambda_{max.}^{KBr}$ 5.64, 5.70, 6.0, 6.13μ; $\lambda_{max.}^{EtOH}$ 283 mμ (ε 14,340)

Analysis.—Calc'd for $C_{24}H_{32}O_4$: C, 74.97; H, 8.42. Found: C, 74.48; H, 8.42.

The above prepared 13-ethyl-3, 17-dihydroxygona-3,5-diene-17α-propionic acid, γ-lactone, acetate (5.5 g.) in acetone (473 ml.), pyridine (3.2 ml.), sodium acetate (15 g.), water (150 ml.) and acetic acid (15 ml.) is chilled to 0° C. and N-bromosuccinimide (2.75 g.) is added to the mixture. The mixture is then stirred at 0° C. for two hours, poured into brine and extracted with ether. Thereafter, most of the ether is removed while the solution temperature is maintained below 15° C. and calcium carbonate (16.5 g.) and dimethylformamide (385 ml.) are added. The ether is then boiled off and the reaction mixture is refluxed for two hours. Filtration, washing of the cake with ether, pouring into brine and extraction with ether followed by washing, drying and evaporating the ether layer yields the crude product. Recrystallization from ethyl acetate yields 13-ethyl-17-hydroxy-3-oxogona-4,6-diene-17α-propionic acid, γ-lactone (2.25 g.) M.P. 216-218° C., $\lambda_{max.}^{KBr}$ 5.67, 6.06, 6.20, 6.34μ; $\lambda_{max.}^{EtOH}$ 284 mμ (ε 21,141)

Analysis.—Calcd. for $C_{22}H_{28}O_3$: C, 77.61; H, 8.29. Found: C, 77.38; H, 8.29.

The 13 - ethyl - 17 - hydroxy - 3 - oxogona - 4,6 -diene - 17α-propionic acid, γ-lactone (2.25 g.) prepared above is then refluxed in thiolacetic acid (5 ml.) for two hours. Subsequently, the excess acid is removed under reduced pressure, the residue triturated with cold ether and filtered. The collected solid is triturated with boiling ethyl acetate, the suspension chilled and filtered to yield 13 - ethyl - 17 - hydroxy - 7α - mercapto - 3 - oxogon - 4 - ene - 17α - propionic acid, γ-lactone, acetate (1.55 g.), M.P. 218–220° C., $\lambda_{max.}^{KBr}$ 5.67, 5.92, 6.0μ; $\lambda_{max.}^{EtOH}$ 240 mμ (ε 19,400)

Analysis.—Calc'd for $C_{24}H_{32}O_4S$: C, 69.21; H, 7.74. Found: C, 69.17; H, 7.44.

EXAMPLE II

13 - butyl - 17 - hydroxy - 3 - oxogon - 4 - ene - 17α - propionic acid, γ-lactone (10.0 g.) is refluxed for four hours with isopropenyl acetate (130 ml.) and p-toluenesulfonic acid (2.0 g.). Thereafter, the liquids are removed under vacuum, the residue triturated with cold ethanol and filtered to yield 13 - butyl - 3,17 - dihydroxygona - 3,5 - diene-17α-propionic acid, γ-lactone, acetate.

The above prepared compound in acetone (950 ml.), pyridine (6.5 ml.), sodium acetate (30 g.), water (300 ml.) and acetic acid (30 g.) is cooled to 5° C. and then admixed with N- bromosuccinimide (5.5 g.). The reaction mixture is stirred at 5° C. for four hours, then poured into a saturated potassium chloride solution and extracted with chloroform. Subsequently, most of the chloroform is removed from the combined extracts (at temperatures below 10° C.) and the residue is admixed with calcium carbonate (33 g.) and dimethylformamide (770 ml.). The remaining chloroform is removed by evaporation and the reaction mixture is refluxed for three hours. The mixture is then filtered, washed with ether, poured in brine and extracted with ether. The combined ether extracts are then evaporated to dryness and the residue recrystallized from ethyl acetate to yield 13 - butyl - 17 - hydroxy - 3 - oxogona-4,6-diene-17α-propionic acid, γ-lactone.

The aforesaid 13 - butyl - 17 - hydroxy - 3 - oxogona - 4,6 - diene - 17α - propionic acid, γ-lactone is then refluxed with thiolpropionic acid (5 ml.) for four hours. Thereafter, the excess acid is removed under vacuum, the residue triturated with cold ether and filtered. The resulting solid is triturated with boiling ethyl acetate, and the suspension chilled and filtered to yield 13-butyl-17-hydroxy-7α - mercapto - 3 - oxogon - 4 - ene - 17α - propionic acid, γ-lactone, propionate.

EXAMPLE III

13 - hexyl - 17 - hydroxy - 3 - oxogon - 4 - ene - 17α - propionic acid, γ-lactone (15.0 g.) is refluxed for three hours with isopropenyl acetate (195 ml.) and sulfuric acid (9 ml.). Thereafter, the liquids are removed under reduced pressure, the residue triturated with propanol and filtered to yield 13 - hexyl - 3,17 - dihydroxy - 3 - oxogon - 3,5 - diene-17α-propionic acid, γ-lactone, acetate.

The above prepared compound in acetone (1420 ml.), pyridine (9.6 ml.), sodium acetate (45 g.), water (450 ml.) and acetic acid (45 g.) is chilled to 0° C. and N-bromosuccinimide (8.25 g.) is added thereto. The mixture is stirred at 0° C. for three hours, poured into brine and extracted with ether. Thereafter, most of the ether is removed, at temperatures below 10° C., and calcium carbonate (50 g.) and dimethylformamide (1150 ml.) are added. The ether is removed by boiling and the reaction mixture is refluxed for three hours. The mixture is then filtered, washed with ether, poured into brine and extracted with ether. The combined extracts are washed, dried and then evaporated to dryness, the residue is recrystallized from ethyl acetate to yield 13 - hexyl - 17 - hydroxy - 3 - oxogona - 4,6 - diene - 17α - propionic acid, γ-lactone.

The 13 - hexyl - 17 - hydroxy - 3 - oxogona - 4,6 - diene - 17α-propionic acid, γ-lactone prepared above is then refluxed in thiolbutyric acid (15 ml.) for three hours. Thereafter, the excess acid is removed under vacuum, the residue triturated with cold hexane and filtered. The solid is triturated with warm ethyl acetate, chilled and filtered to obtain 13 - hexyl - 17 - hydroxy - 7α - mercapto - 3 - oxogona-4-ene-17α-propionic acid, γ-lactone, butyrate.

EXAMPLE IV

17 - hydroxy - 3 - oxogon - 4 - ene - 13 - propyl - 17α - propionic acid, γ-lactone (5.0 g.) is refluxed for two hours with propionic anhydride (90 ml.) and p-toluenesulfonic acid (1 g.). Thereafter, the liquids are removed under vacuum, the residue triturated with cold methanol and filtered to yield 3,17 - dihydroxygona - 3,5 - diene - 13 - propyl-17α-propionic acid, γ-lactone, propionate.

The above prepared 3,17 - dihydroxygona-3,5-diene-13-propyl-17α-propionic acid, γ-lactone, propionate in acetone (473 ml.), pyridine (3.2 ml.) sodium acetate (15 g.), water (150 ml.) and acetic acid (15 ml.) is chilled to 0° C. and N-bromosuccinimide (2.75 g.) is added thereto. The mixture is stirred at 0° C. for two hours, poured into brine and extracted with ether. Most of the ether is removed not allowing the solution above 15° C. and calcium carbonate (16.5 g.) and dimethylformamide (385 ml.) are added. The ether is boiled off and the reaction mixture is refluxed for two hours. Filtration, washing of the cake with ether, pouring into brine and extraction with ether followed by washing, drying and evaporating the ether layer gives the crude product. Recrystallization from ethyl acetate provides 17-hydroxy - 3 - oxogona-4,6-diene-13-propyl-17α-propionic acid, γ-lactone.

The above prepared compound is refluxed in thiolvaleric acid (5 ml.) for two hours. The excess acid is removed under reduced pressure, the residue triturated with ice cold ether and filtered. The solid is triturated with boiling ethyl acetate, the suspension chilled and filtered to obtain 17 - hydroxy - 7α - mercapto - 3 - oxogona - 4 - ene - 13 - propyl-17α-propionic acid, γ-lactone, valerate.

What is claimed is:

1. An anti-diuretic compound selected from the group consisting of those having the formula:

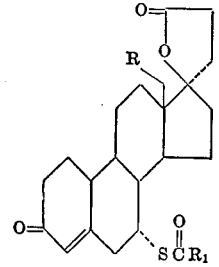

wherein R is alkyl containing from two to six carbon atoms and $R_1$ is lower alkyl.

2. As an anti-diuretic compound, 13-ethyl-17-hydroxy-7α - mercapto - 3 - oxogon - 4 - ene - 17α - propionic acid, γ-lactone, acetate.

3. As an anti-diuretic compound, 13-butyl-17-hydroxy-7α - mercapto - 3 - oxogon - 4 - ene - 17α - propionic acid, γ-lactone, propionate.

4. As an anti-diuretic compound, 13-hexyl-17-hydroxy-7α - mercapto - 3 - oxogona - 4 - ene - 17α - propionic acid, γ-lactone, butyrate.

5. As an anti-diuretic compound, 17 - hydroxy - 7α - mercapto - 3 - oxogona - 4 - ene - 13 - propyl - 17α -propionic acid, γ-lactone, valerate.

References Cited

UNITED STATES PATENTS 3,013,012  12/1961  Cella et al. _____ 260—239.57

OTHER REFERENCES

Smith et al.: Experientia, August 1963, pp. 394–396.

LEWIS GOTTS, *Primary Examiner.*

ETHEL G. LOVE, *Assistant Examiner.*

U.S. Cl. X.R.

260—999